US008510701B2

(12) United States Patent
Ko et al.

(10) Patent No.: US 8,510,701 B2
(45) Date of Patent: Aug. 13, 2013

(54) OVER STRESS VERIFY DESIGN RULE CHECK

(75) Inventors: Chen-Ting Ko, Hsinchu (TW); Chih-Hsien Chang, New Taipei (TW); Yung-Chow Peng, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/350,894

(22) Filed: Jan. 16, 2012

(65) Prior Publication Data
US 2013/0185688 A1    Jul. 18, 2013

(51) Int. Cl.
*G06F 17/50* (2006.01)

(52) U.S. Cl.
USPC ............ 716/127; 716/112; 716/126; 716/139

(58) Field of Classification Search
USPC .................................. 716/112, 126–127, 139
See application file for complete search history.

(56) References Cited

U.S. PATENT DOCUMENTS

| | | | | |
|---|---|---|---|---|
| 5,570,002 A * | 10/1996 | Castleman | ................... | 323/283 |
| 6,055,366 A * | 4/2000 | Le et al. | ........................ | 716/112 |
| 6,086,628 A * | 7/2000 | Dave et al. | .................... | 716/105 |
| 6,117,179 A * | 9/2000 | Tan et al. | ......................... | 703/14 |
| 6,266,798 B1 * | 7/2001 | Kanazawa et al. | ........... | 716/109 |
| 6,820,240 B2 * | 11/2004 | Bednar et al. | ................. | 716/113 |
| 7,053,656 B2 * | 5/2006 | Seo | ................................. | 326/68 |
| 7,117,462 B2 * | 10/2006 | Kimura et al. | ................ | 716/112 |
| 7,127,623 B2 * | 10/2006 | Potega | .......................... | 713/300 |
| 7,178,126 B2 * | 2/2007 | Arai et al. | ..................... | 716/120 |
| 7,305,639 B2 * | 12/2007 | Floyd et al. | .................... | 716/112 |
| 7,418,683 B1 * | 8/2008 | Sonnard et al. | ............... | 716/122 |
| 7,463,057 B1 * | 12/2008 | Rahim et al. | .................... | 326/38 |
| 7,694,241 B1 * | 4/2010 | Jadcherla et al. | ............. | 716/127 |
| 7,886,240 B2 * | 2/2011 | Adkisson et al. | ............. | 716/111 |
| 8,028,259 B2 * | 9/2011 | Phan Vogel | ................... | 716/111 |
| 8,086,980 B2 * | 12/2011 | Vogel | ............................. | 716/111 |
| 2002/0040465 A1 * | 4/2002 | Kimura et al. | ..................... | 716/5 |
| 2004/0060023 A1 * | 3/2004 | Bednar et al. | ..................... | 716/7 |
| 2006/0026479 A1 * | 2/2006 | Umehara et al. | .............. | 714/738 |
| 2006/0184905 A1 * | 8/2006 | Floyd et al. | ........................ | 716/5 |
| 2009/0070716 A1 * | 3/2009 | Joshi et al. | ......................... | 716/2 |
| 2009/0172617 A1 * | 7/2009 | Huang et al. | ...................... | 716/5 |

* cited by examiner

*Primary Examiner* — Naum Levin
(74) *Attorney, Agent, or Firm* — Eschweiler & Associates, LLC

(57) ABSTRACT

Some aspects of this disclosure provide for electronic design automation (EDA) techniques that check whether individual blocks, such as transistors or other semiconductor devices, are connected to their correct power domains during design. In this way, the disclosed EDA techniques can limit or prevent overstress conditions applied to blocks and help to improve reliability of integrated circuits, when manufactured.

11 Claims, 5 Drawing Sheets

OVER STRESS VERIFY DESIGN RULE CHECK

BACKGROUND

Modern integrated circuits often include millions or even billions of semiconductor devices, such as transistors, diodes, and capacitors, among others. To help integrated circuit designers arrange these devices on the final integrated circuit, electronic design automation (EDA) software tools have been developed. These EDA tools, which often have a computer aided design (CAD) interface, can help designers arrange devices and verify whether a given arrangement of devices is in accordance with a manufacturer's fabrication rules. By providing designers with a flexible CAD interface where design changes are relatively quick and easy to implement, EDA tools help to ensure that integrated circuits, when actually manufactured, function as envisioned by a designer. This disclosure relates to improved EDA tools.

DETAILED DESCRIPTION

Figure 1:
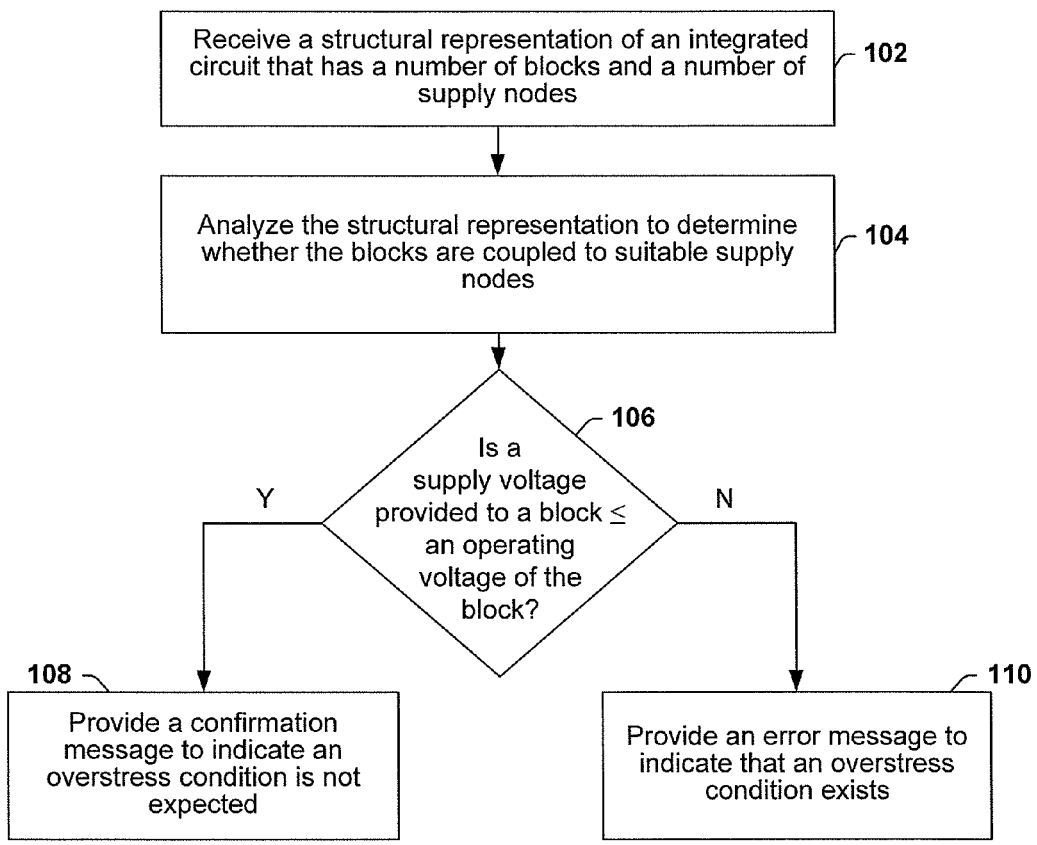
FIG. 1 illustrates an overstress verify check method in accordance with some embodiments.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details.

A modern integrated circuit (IC) can include millions or billions of transistors, wherein different transistors can have different structural features suited for different power domains. Low-voltage transistors, for example, can have relatively thin gate oxides and/or relatively short channel lengths which are suitable for fast-switching at low voltages, while high-voltage analog transistors can have relatively thick gate oxides and/or relatively long channel lengths which are suitable for driving larger outputs. In some implementations, the low-voltage transistors can operate using a relatively small voltage bias of 1.2 volts, while analog transistors can operate using a relatively large voltage bias of 3.3 volts, for example. Although conventional EDA tools allow designers to utilize multiple power domains, conventional EDA tools do not have an effective way to determine whether or not a given transistor is coupled to the "correct" power supply. For example, if a low-voltage transistor having a relatively thin gate oxide (expected to operate with a 1.2 V bias) is coupled to a 3.3 volt supply voltage (intended to be provided to a high-voltage analog transistor), conventional EDA tools have no way of detecting this error. Consequently, if the integrated circuit is actually manufactured with this error in place, the 3.3 volt supply voltage can overstress the low-voltage transistor, potentially damaging the gate oxide of the low-voltage device and/or leading to hot carrier effects.

To prevent or limit such overstress conditions from arising, aspects of this disclosure provide for EDA tools that check whether individual blocks are connected to the correct power domain during design. In this way, the present disclosure allows designers to make edits to the design to correct this error, thereby helping to improve reliability of manufactured integrated circuits.

FIG. 1 shows a flow chart illustrating one method 100 for overstress verification carried out by an EDA tool in accordance with this disclosure. At 102, the EDA tool receives a structural representation of an integrated circuit including a number of blocks (e.g., one or more transistors or other semiconductor devices) and a number of supply nodes (e.g., interconnect layers, nodes between transistors, or power rails). In this structural representation, a designer and/or the EDA tool has labeled respective blocks with respective operating voltages and has labeled respective supply nodes with respective supply voltages. For example, a first block can be labeled "1.2 V operating voltage", a second block can be labeled "2.5 V operating voltage", and a third block can be labeled "3.3V operating voltage". Similarly, a first supply node can be labeled "1.2 V supply voltage", a second supply node can be labeled "2.5 V supply voltage", and a third supply node can be labeled "3.3 V supply voltage".

In 104, the EDA tool analyzes the structural representation to verify whether the blocks are coupled to suitable supply nodes. At 106, for example, the method can determine whether a supply voltage of a supply node is less than or equal to an operating voltage of a block to which the supply node is coupled. For example, for a transistor block labeled with a 2.5 V operating voltage, the method can verify that a supply node coupled to the transistor supplies a bias of 2.5V or less to the transistor. In other embodiments, the method can check whether the block is labeled with an operating voltage that exactly matches the supply voltage, or whether the block is labeled with an operating voltage that falls within some predetermined range/threshold about the supply voltage.

If the supply voltage and operating voltage have a suitable relationship that will not damage the block ("Y" at 106), the EDA tool can provide a confirmation message in 108. This confirmation message indicates an overstress condition is not expected.

If the supply voltage and operating voltage have an adverse relationship that might cause harm to the block ("N" at 106), the EDA tool provides an error message in 110. This error message alerts a designer to the possibility that an overstress condition is present, and allows the designer to revise the structural representation of the integrated circuit to remove the overstress condition, thereby helping to ensure that the integrated circuit, when actually manufactured, works as desired.

Figure 2:
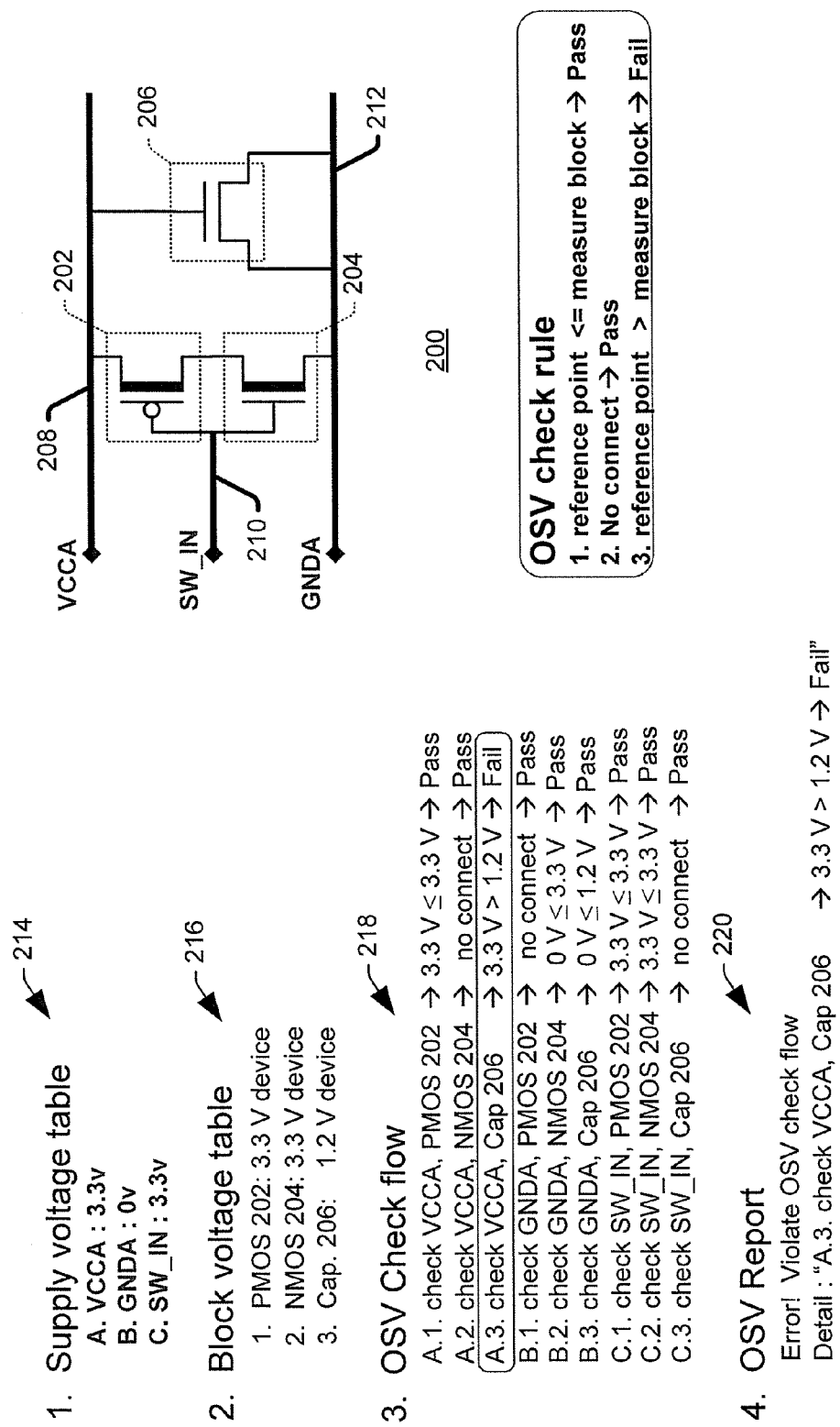
FIG. 2 illustrates an overstress verify check method in accordance with other embodiments.

FIG. 2 illustrates a more concrete example of how an overstress verify check rule can be implemented. In particular, this example is described with reference to a structural IC representation 200 that includes a first block 202 in the form of a PMOS transistor, a second block 204 in the form of an NMOS transistor, and a third block 206 in the form of a capacitor. The structural IC representation 200 also includes a first supply node 208 in the form of VCCA (e.g., a 3.3 V supply node); a second supply node 210 in the form of SW_IN (e.g., a 3.3 V supply node); and a third supply node 212 in the form of GNDA (e.g., a 0 V supply node).

To conduct an overstress verify check, the EDA tool and/or a designer labels the respective supply nodes with their respective supply voltages. These can be stored in a supply node table in memory of the EDA tool, as shown by 214. In FIG. 2's example, supply node VCCA is labeled with a supply voltage of 3.3V, supply node GNDA is labeled with a supply voltage of 0V, and supply node SW_IN is labeled with a supply voltage of 3.3 V. It will be appreciated that these voltages are merely a non-limiting example, and that practically any array of supply voltages, including more than three voltages or less than three voltages having any voltage values, could be provided in other examples.

The EDA tool and/or a designer has also labeled the respective blocks with their respective operating voltages prior to the overstress verify check. These can be stored in a block table in memory of the EDA tool, as shown by 216. In FIG. 2's example, the first block 202 has been labeled as a 3.3V device, second block 204 has been labeled as a 3.3V device, and third block 206 has been labeled as a 1.2 V device. These operating voltages can correspond to the voltage bias the respective devices are designed to safely withstand without experiencing degradation. Thus, these operating voltages can correspond to gate dielectric thickness or channel length, among other device features.

The EDA tool can then trace each supply node and identify what blocks are coupled to the respective supply nodes. For each identified block, the EDA tool then compares the supply voltage of the supply node to the operating voltage of the block, as shown at 218. The EDA tool can then output a pass/fail message for each block, indicating whether an overstress condition is present for any devices. For example, in FIG. 2's illustrated example, the capacitor 206 has a first plate (e.g., gate region) coupled to 3.3 V VCCA node and has a second plate (e.g., source/drain regions in substrate) coupled to 0V GNDA node, such that a 3.3 V bias is applied across the capacitor 206. The capacitor 206 is, however, labeled with an operating voltage of 1.2V, as specified in the block table 216. Because the 1.2V operating voltage of the capacitor 206 is less than the bias of 3.3V applied to the capacitor, this structural IC representation 200 has an overstress condition where the 3.3 V might damage the capacitor 206.

Therefore, the EDA tool provides a report that informs the user of the overstress condition in 220. After reviewing the report, the user can revise the structural representation of the integrated circuit stored in the EDA tool, thereby helping the designer to provide an integrated circuit design that, when manufactured, achieves desired functionality.

Figure 3:
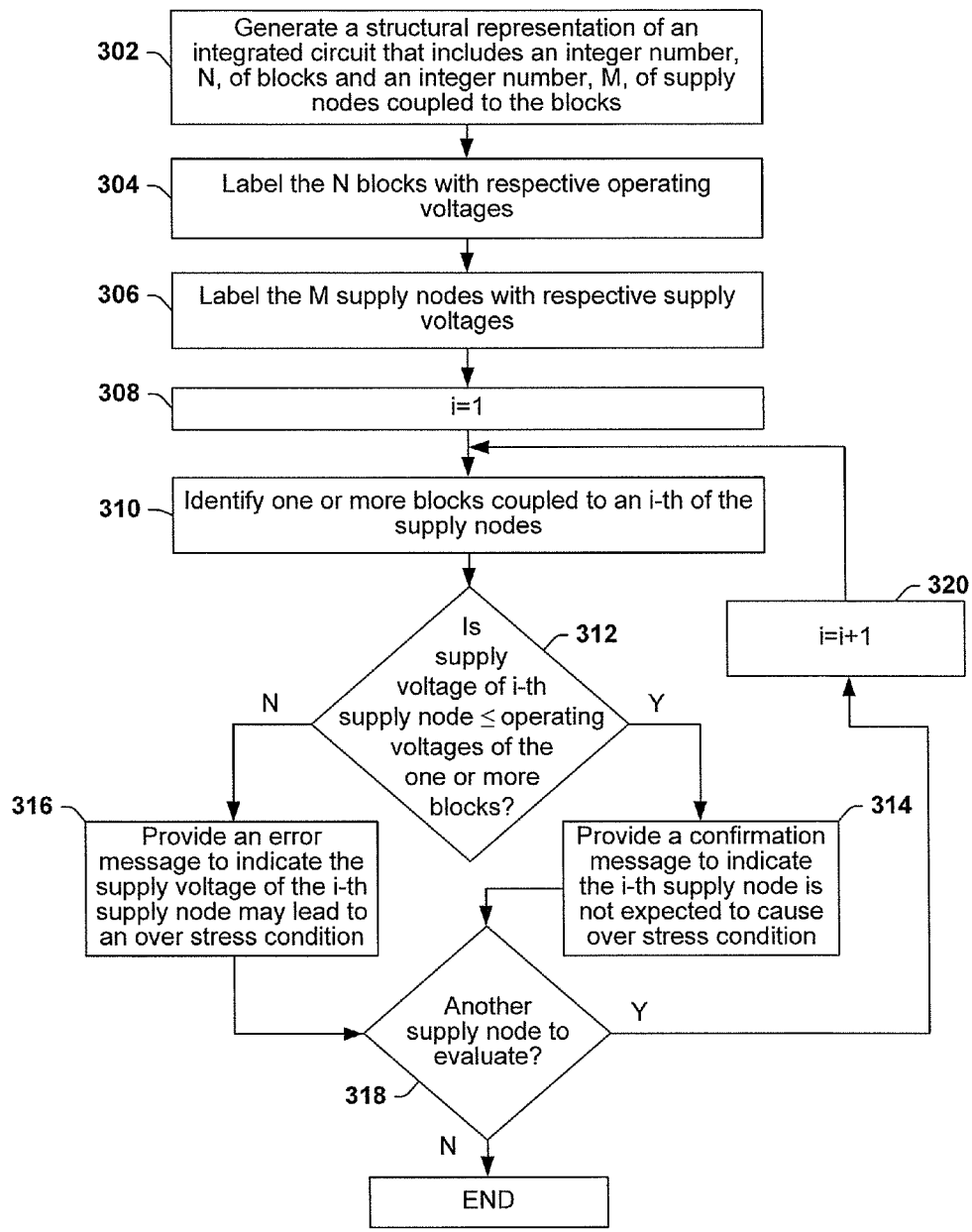
FIG. 3 illustrates an overstress verify check method in accordance with still other embodiments.

FIG. 3 illustrates another methodology in accordance with some aspects of the present disclosure. At 302, the method generates a structural representation of an integrated circuit that includes an integer number, N, of blocks and an integer number, M, of supply nodes coupled to the blocks. N and M are positive integers and can be the same or different. The structural representation can be a circuit schematic, a netlist, or a layout representation (e.g., .GDS file, .GDSII file, Oasis file, Caltech intermediate file).

At 304, the method labels the N blocks with respective operating voltages. Often the respective operating voltages include at least two different operating voltages other than ground. For example, low-voltage devices used in a microprocessor on the IC can be labeled as 1.2 V devices; I/O devices used near the chip periphery can be labeled as 2.5 V devices; and high-voltage analog devices can be labeled as 3.3 V devices; all of which are measured relative to ground (0V).

At 306, the method labels the M supply nodes with respective supply voltages. Often the respective supply voltages include at least two different supply voltages other than ground.

After a variable i has been initialized to 1 in 308, the method proceeds to 310 and identifies one or more blocks coupled to a first (i=1) of the supply nodes.

At 312, the method compares the supply voltage of the first supply node to respective operating voltages of the one or more blocks. If the supply voltage is less than or equal to the respective operating voltages of the one or more blocks ("Y" at 312), the method can proceeds to 314 and provide a confirmation message to indicate the i-th supply node is not expected to cause an overstress condition. On the other hand, if the supply voltage is greater than an operating voltage of one or more of the blocks ("N" at 312), the method can proceed to 316 and provide an error message to indicate the i-th supply node may lead to an overstress condition. The method then determines if there is another supply node to evaluate in 318, and if so, increments i in 320 and evaluates the next supply node and the blocks coupled thereto. If error messages are present, a designer can subsequently revise the structural representation of the integrated circuit to correct the errors to ensure the integrated circuit, when actually manufactured, functions as desired.

Figure 4:
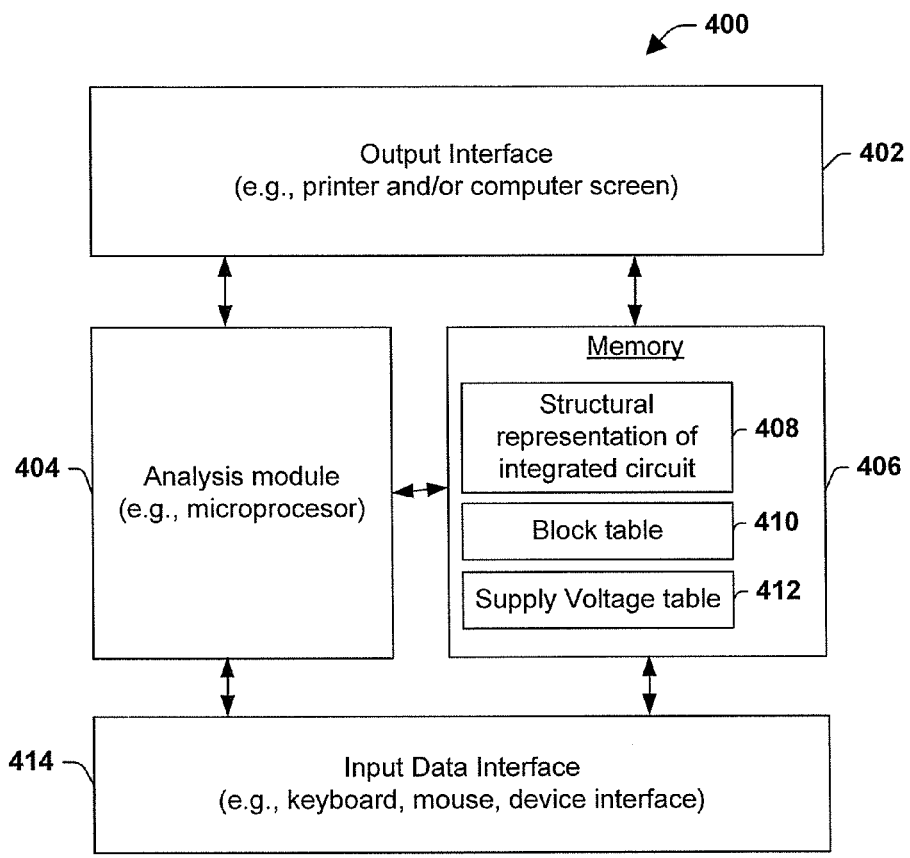
FIG. 4 illustrates an EDA tool in accordance with some embodiments.

FIG. 4 depicts an EDA tool 400 for implementing the methodologies described herein. The EDA tool 400 includes an output interface 402 coupled to an analysis module 404, such as a microprocessor running software or firmware instructions. The analysis module 404 may be coupled to memory 406, which can be implemented as volatile or non-volatile memory that stores executable code capable of causing the analysis module 404 to perform the processes described herein. A structural IC representation 408 is stored in the memory 406, as is a supply voltage table 410 (e.g., 214 in FIG. 2), and a block voltage table 412 (e.g., 216 in FIG. 2). The memory can also include design rules and other appropriate programs and files, while are often input via an input data interface 414. The analysis module 404 may retrieve and execute the code to analyze the structural representation 408 to determine if one or more overstress conditions are present.

Figure 5:
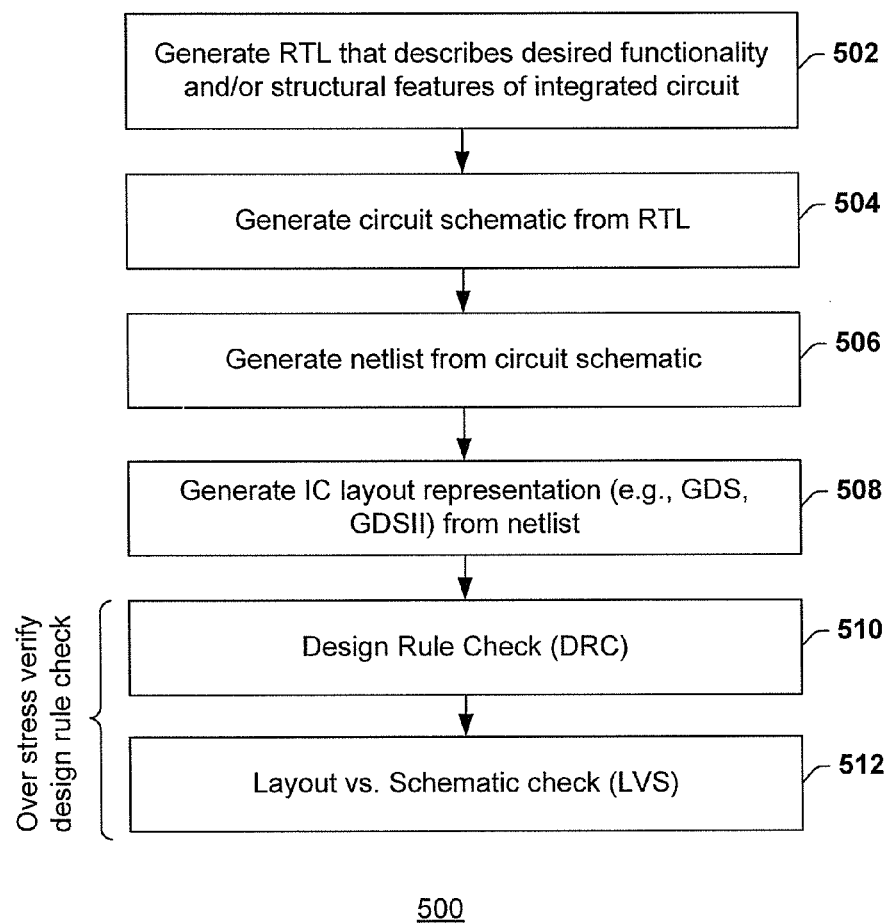
FIG. 5 illustrates an EDA tool design flow in accordance with some embodiments.

FIG. 5 illustrates one non-limiting example of an EDA design flow that may be used by integrated circuit designers in some contexts. As with all methods disclosed herein, while this EDA flow is illustrated and described below as a series of acts or events, the present disclosure is not limited by the illustrated ordering of such acts or events. Other acts may be included in addition to (and/or in place of) those acts illustrated, and not all illustrated acts are required. Some acts may occur in different orders and/or concurrently with other acts or events apart from those illustrated and/or described herein.

In this design flow 500, a designer can begin to design an integrated circuit using register transfer language (RTL) coding at 502, which expresses desired IC functionality in words, software terminology, and/or mathematical expressions. Examples of RTL coding languages include Verilog and VHDL.

At block 504, the illustrated EDA tool flow generates a circuit schematic from the RTL description. This circuit schematic is made up of circuit symbols (e.g., resistor symbols, transistor symbols, capacitor symbols, inductor symbols) and can be displayed to a user/designer via a graphical user interface (GUI). The circuit schematic need not be generated from RTL code, however, and in some implementations the circuit schematic can be generated by a designer, who can manually connect circuit symbols (e.g., resistors, transistors, capacitors) together in the EDA tool simulation environment.

At block 506, the EDA tool flow generates a netlist from the circuit schematic. This netlist is a version of the integrated circuit consisting of all of the circuit element names/reference designators, listed with their input and output signal names, in a format such as <element name><input signals><output signals>. Netlists are the primary form of a circuit used for CAD simulation.

At block 508, the EDA tool flow generates an IC layout representation from the netlist. The IC layout representation includes multiple layers (e.g., doped semiconductor layers, metal layers, and insulating layers) that collectively build up an integrated circuit. In some embodiments, the IC layout representation can be in .GDS format, .GDSII format, Caltech intermediate file format, or OASIS format, among others. The IC layout can also make use of different power domains. For example, there can be 1.2 V core devices, 2.5 V I/O devices, and 3.3 V analog devices all on the same integrated circuit.

At block 510, the EDA tool flow performs a DRC check, which checks the features in the IC layout against ground rules specified by the fabrication facility. For example, the DRC check can check whether spacing between device features is at least some minimal distance specified by the fabrication facility, for example.

At 512, the EDA tool flow performs a layout versus Schematic check to verify that the IC layout is, in fact, the same as the schematic.

Various blocks in this design flow can provide to a structural representation of an integrated circuit suitable for overstress verification checking. For example, as shown in FIG. 5, the overstress verify design rule check is often carried out as part of the DRC or LVS operations. However, the overstress verify check could also be carried out in combination with other blocks or as its own separate block during this EDA tool flow. In addition, it will be appreciated that FIG. 5 is merely one example of an EDA tool flow, and that other EDA tool flows are also contemplated as falling within this disclosure.

Those skilled in the art will realize that EDA tools and EDA tool flows may utilized computer readable instructions which can be stored an a computer readable medium. Thus, the methods disclosed herein may be implemented as computer readable instructions stored on such a computer readable medium. The term "computer readable medium" as used herein includes volatile and nonvolatile, removable and non-removable media implemented in any method or technology for storage of information such as computer readable instructions or other data. Memory (e.g., 406 in FIG. 4) is an example of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information. The term "computer readable media" may also include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Thus, it will be appreciated that the present disclosure relates to EDA techniques. One embodiment relates to a method where an EDA tool receives a structural representation of an integrated circuit. The structural representation includes a number of blocks labeled with respective operating voltages, and a number of supply nodes labeled with respective supply voltages, wherein a supply node is coupled to a block. The method then determines whether or not the supply voltage with which the supply node is labeled has a predetermined relationship with an operating voltage with which the block is labeled.

Another embodiment relates to an EDA tool. The EDA tool includes memory to store a structural representation of an integrated circuit. The structural representation includes a number of blocks labeled with respective operating voltages, and a supply node labeled with a supply voltage coupled to one or more of the plurality of blocks. The EDA tool also includes an analysis module to determine whether or not a magnitude of the supply voltage has a pre-determined relationship with respective magnitudes of the respective operating voltages with which the one or more blocks are labeled.

Still another embodiment relates to a method. In this method, a structural representation of an integrated circuit is generated. The structural representation includes a number of transistors and a number of supply nodes, wherein a supply node is coupled to a transistor. The number of supply nodes are labeled with respective supply voltages. The number of transistors are labeled with respective operating voltages, wherein an operating voltage of the transistor corresponds to a upper voltage which the transistor is expected to safely withstand without experiencing degradation or catastrophic failure. The method then determines whether or not a magnitude of the supply voltage with which the supply node is labeled is less than or equal to a magnitude of the operating voltage with which the transistor is labeled. An error message is provided if the magnitude of the supply voltage is greater than or equal to the operating voltage of the transistor.

It will be appreciated that identifiers such as "first" and "second" do not imply any type of ordering or placement with respect to other elements; but rather "first" and "second" and other similar identifiers are just generic identifiers. In addition, it will be appreciated that the term "electrically connected" includes direct and indirect connections. For example, if element "a" is electrically connected to element "b", element "a" can be electrically connected directly to element "b" and/or element "a" can be electrically connected to element "b" through element "c", so long as there is an operable electrical connection between elements "a" and "b".

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An EDA tool, comprising:
memory to store a structural representation of an integrated circuit, the structural representation comprising: a plurality of blocks labeled with respective operating voltages, and a supply node labeled with a supply voltage coupled to one or more of the plurality of blocks; and
an analysis module configured to calculate a voltage difference between the supply voltage and an operating voltage with which a block is labeled, and further configured to compare the calculated voltage difference to a predetermined voltage range disposed about the supply voltage.

2. The EDA tool of claim 1, wherein the supply node is at least one of: an interconnect layer, a node between transistors, or a power rail.

3. The EDA tool of claim 1, wherein the plurality of blocks comprise a plurality of transistors, respectively, that are collectively labeled with at least two different operating voltages, wherein each transistor has one of at least two different gate oxide thicknesses corresponding to one of the at least two different operating voltages.

4. The EDA tool of claim 1, wherein the plurality of blocks comprise a plurality of transistors, respectively, that are collectively labeled with at least two different operating voltages, wherein each transistor has one of at least two different gate lengths corresponding to one of the at least two different operating voltages.

5. The EDA tool of claim 1, further comprising:
an output interface to provide an error message when the calculated voltage difference is greater than or equal to the predetermined voltage range.

6. The EDA tool of claim 1, further comprising:
an output interface to provide an error message when the calculated voltage difference is greater than or equal to a predetermined overstress voltage, wherein the predetermined overstress voltage has a voltage level that is sufficient to potentially damage the block.

7. The EDA tool of claim 1, further comprising:
an RTL converter to convert an RTL description specifying functionality for the integrated circuit to the structural representation of the integrated circuit.

8. The EDA tool of claim 1, wherein the integrated circuit structural representation is a circuit schematic.

9. The EDA tool of claim 1, wherein the integrated circuit structural representation is a netlist.

10. The EDA tool of claim 1, wherein the integrated circuit structural representation is a GDS file, a GDSII file, Caltech intermediate file format, OASIS format, or integrated circuit layout file.

11. The EDA tool of claim 1, wherein the structural representation comprises:
a first block labeled with a first operating voltage;
a second block labeled with a second operating voltage different from the first operating voltage; and
and a third block labeled with a third operating voltage different from the first and second operating voltages.

* * * * *